(12) United States Patent
Kado

(10) Patent No.: US 11,609,415 B2
(45) Date of Patent: Mar. 21, 2023

(54) MEDICAL PROJECTION APPARATUS AND MEDICAL OBSERVATION SYSTEM INCLUDING AT LEAST TWO PROJECTORS PROVIDING CROSSED ILLUMINATION

(71) Applicant: Sony Olympus Medical Solutions Inc., Tokyo (JP)

(72) Inventor: Masataka Kado, Tokyo (JP)

(73) Assignee: SONY OLYMPUS MEDICAL SOLUTIONS INC., Tokyo (JP)

(\*) Notice: Subject to any disclaimer, the term of this patent is extended or adjusted under 35 U.S.C. 154(b) by 163 days.

(21) Appl. No.: 17/146,498

(22) Filed: Jan. 12, 2021

(65) Prior Publication Data
US 2021/0271066 A1    Sep. 2, 2021

(30) Foreign Application Priority Data
Mar. 2, 2020    (JP) .............................. JP2020-035367

(51) Int. Cl.
*G02B 21/36*    (2006.01)
*G02B 21/00*    (2006.01)

(52) U.S. Cl.
CPC ......... *G02B 21/364* (2013.01); *G02B 21/006* (2013.01); *G02B 21/0012* (2013.01); *G02B 21/0032* (2013.01)

(58) Field of Classification Search
CPC .............. G02B 21/364; G02B 21/0012; G02B 21/0032; G02B 21/006; G02B 21/00; G02B 21/0004; G02B 7/001; G02B 21/06; G02B 21/24; G02B 21/36; G02B 21/361
USPC ....... 359/368, 362, 363, 369, 385, 388, 389, 359/390
See application file for complete search history.

(56) References Cited

U.S. PATENT DOCUMENTS

| | | | |
|---|---|---|---|
| 8,755,114 B1 * | 6/2014 | Tanner ................. | G02B 21/084 359/387 |
| 8,958,147 B2 * | 2/2015 | Tanner ................. | G02B 21/084 359/385 |
| 2002/0109912 A1 * | 8/2002 | Knoblich ............. | G02B 21/082 359/385 |
| 2011/0134225 A1 * | 6/2011 | Saint-Pierre ........... | G01B 11/03 348/47 |

\* cited by examiner

*Primary Examiner* — Arnel C Lavarias
(74) *Attorney, Agent, or Firm* — Xsensus LLP

(57) ABSTRACT

A medical projection apparatus includes: a plurality of projectors each configured to project projection light onto an observation area of an observation optical system, wherein at least two or more projectors of the plurality of projectors are configured to respectively emit projection light to different planes including an optical axis of the observation optical system, and the projection light emitted by the two or more projectors cross each other in any position within a range of at least a possible working distance of the observation optical system.

13 Claims, 7 Drawing Sheets

MEDICAL PROJECTION APPARATUS AND MEDICAL OBSERVATION SYSTEM INCLUDING AT LEAST TWO PROJECTORS PROVIDING CROSSED ILLUMINATION

CROSS-REFERENCE TO RELATED APPLICATION

This application claims priority from Japanese Application No. 2020-035367, filed on Mar. 2, 2020, the contents of which are incorporated by reference herein in its entirety.

BACKGROUND

The present disclosure relates to a medical projection apparatus and a medical observation system.

With regard to a camera for a medical use or an industrial use, there has been known a technique of applying projection light in order for an observer to locate the center of an observation position (refer to JP No. 2002-214535 A, for example). According to JP No. 2002-214535 A, projection light is caused to be incident upon illuminating light from outside an illumination optical system through reflection by a mirror, and is applied to an observation area.

SUMMARY

JP No. 2002-214535 A includes provision of a mirror that reflects projection light, and thus is faced with problems of an increase in size of an apparatus and complication of the apparatus configuration.

There is a need for a medical projection apparatus and a medical observation system that enable perception of the center position of an observation area with a simple configuration.

According to one aspect of the present disclosure, there is provided a medical projection apparatus including: a plurality of projectors each configured to project projection light onto an observation area of an observation optical system, wherein at least two or more projectors of the plurality of projectors are configured to respectively emit projection light to different planes including an optical axis of the observation optical system, and the projection light emitted by the two or more projectors cross each other in any position within a range of at least a possible working distance of the observation optical system.

DETAILED DESCRIPTION

Below, modes for carrying out the present disclosure (hereinafter referred to as "embodiments") will be described with reference to the accompanying drawings. Note that the drawings are just schematic representations, and the drawings include parts different from each other in relation of dimension or in ratio in some cases.

Embodiment

Figure 1:
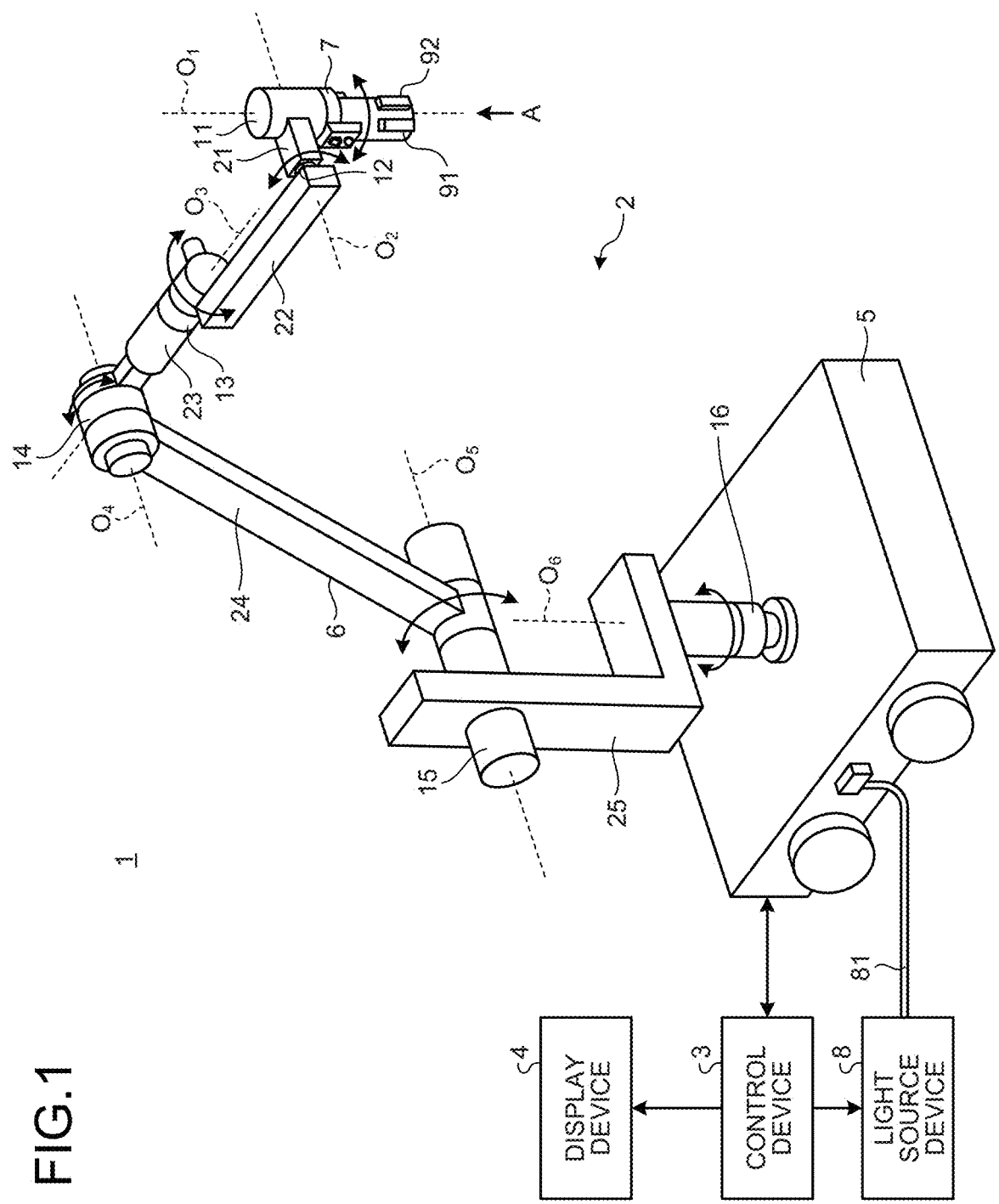
FIG. 1 is a view illustrating a configuration of a medical observation system according to an embodiment of the present disclosure.
Figure 2:
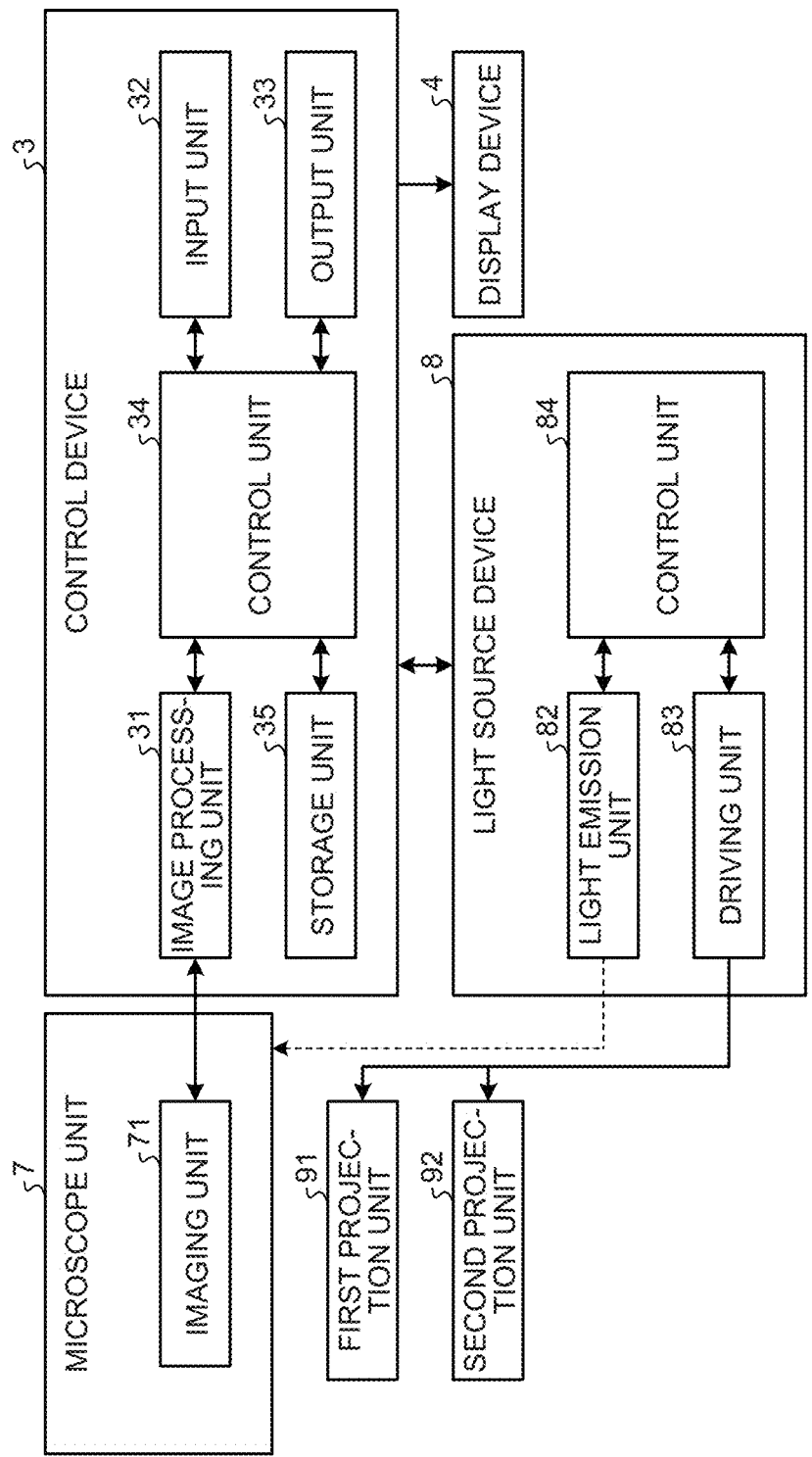
FIG. 2 is a block diagram illustrating the configuration of the medical observation system according to the embodiment of the present disclosure.

FIG. 1 is a view illustrating a configuration of a medical observation system according to an embodiment. FIG. 2 is a block diagram illustrating the configuration of the medical observation system according to the embodiment. A medical observation system 1 includes a microscope device 2 having a function of a microscope that enlarges a microstructure of an observed object and captures an image, a control device 3 that exercises centralized control over operations of the medical observation system 1, a display device 4 that displays an image captured by the microscope device 2, and a light source device 8 that supplies illuminating light to the microscope device 2.

The microscope device 2 includes a base unit 5 that is movable on a floor surface, a support unit 6 supported by the base unit 5, and a columnar microscope unit 7 that is provided in a distal end of the support unit 6, enlarges a micro part of an observed object, and captures an image.

In the microscope device 2, a group of cables including a transmission cable including a signal line for signal transmission between the control device 3 and the microscope unit 7, a light-guide cable for guiding illuminating light from the light source device 8 to the microscope unit 7, and the like, for example, are laid over the device from the base unit 5 to the microscope unit 7.

The support unit 6 includes a first joint 11, a first arm 21, a second joint 12, a second arm 22, a third joint 13, a third arm 23, a fourth joint 14, a fourth arm 24, a fifth joint 15, a fifth arm 25, and a sixth joint 16.

The support unit 6 includes four sets each formed of two arms and a joint that joins one (on a distal-end side) of the two arms to the other (on a proximal-end side) so that the one arm may turn relative to the other. More specifically, the four sets include a set formed of the first arm 21, the second joint 12, and the second arm 22, a set formed of the second arm 22, the third joint 13, and the third arm 23, a set formed of the third arm 23, the fourth joint 14, and the fourth arm 24, and a set formed of the fourth arm 24, the fifth joint 15, and the fifth arm 25.

The first joint 11 holds the microscope unit 7 on its distal-end side so that the microscope unit 7 may turn, and is held by the first arm 21 on its proximal-end side while being fixed to a distal end of the first arm 21. The first joint 11 has a cylindrical shape and holds the microscope unit 7 so that the microscope unit 7 may turn about a first axis $O_1$ that is a central axis along a height direction. The first arm 21 has a shape that extends from a side surface of the first joint 11 along a direction perpendicular to the first axis $O_1$.

The second joint 12 holds the first arm 21 on its distal-end side so that the first arm 21 may turn, and is held by the second arm 22 on its proximal-end side while being fixed to a distal end of the second arm 22. The second joint 12 has a cylindrical shape and holds the first arm 21 so that the first arm 21 may turn about a second axis $O_2$ that is a central axis along a height direction and is perpendicular to the first axis $O_1$. The second arm 22 is substantially L-shaped and is joined to the second joint 12 at an end of a portion corresponding to a vertical line of its shape "L".

The third joint 13 holds the second arm 22 on its distal-end side so that a portion corresponding to a horizontal line of the shape "L" of the second arm 22 may turn, and is held by the third arm 23 on its proximal-end side while being fixed to a distal end of the third arm 23. The third joint 13 has a cylindrical shape and holds the second arm 22 so that the second arm 22 may turn about a third axis $O_3$ that is a central axis along a height direction, is perpendicular to the second axis $O_2$, and is parallel to a direction in which the second arm 22 extends. In the third arm 23, a portion on a distal-end side has a cylindrical shape and a portion on a proximal-end side has a hole drilled therethrough in a direction perpendicular to a height direction of the cylindrical shape of the portion on a distal-end side. The third joint 13 is turnably held by the fourth joint 14 via the hole.

The fourth joint 14 holds the third arm 23 on its distal-end side so that the third arm 23 may turn, and is held by the fourth arm 24 on its proximal-end side while being fixed to the fourth arm 24. The fourth joint 14 has a cylindrical shape and holds the third arm 23 so that the third arm 23 may turn about a fourth axis $O_4$ that is a central axis along a height direction and is perpendicular to the third axis $O_3$.

The fifth joint 15 holds the fourth arm 24 on its distal-end side so that the fourth arm 24 may turn, and is fixedly mounted onto the fifth arm 25 on its proximal-end side. The fifth joint 15 has a cylindrical shape and holds the fourth arm 24 so that the fourth arm 24 may turn about a fifth axis $O_5$ that is a central axis along a height direction and is parallel to the fourth axis $O_4$. The fifth arm 25 includes an L-shaped portion and a bar-shaped portion that extends downward from a portion corresponding to a horizontal line of the shape "L". The fifth joint 15 is mounted in an end of a portion corresponding to a vertical line of the shape "L" of the fifth arm 25 on a proximal-end side.

The sixth joint 16 holds the fifth arm 25 on its distal-end side so that the fifth arm 25 may turn, and is fixedly mounted onto an upper surface of the base unit 5 on its proximal-end side. The sixth joint 16 has a cylindrical shape and holds the fifth arm 25 so that the fifth arm 25 may turn about a sixth axis $O_6$ that is a central axis along a height direction and is perpendicular to the fifth axis $O_5$. A proximal end of the bar-shaped portion of the fifth arm 25 is mounted onto a portion on a distal-end side in the sixth joint 16.

The support unit 6 having the above-described configuration implements movement in six degrees of freedom that is a sum of three degrees of translational freedom and three degrees of rotary freedom, in the microscope unit 7.

The first to sixth joints 11 to 16 include electromagnetic brakes that stop turning of the microscope unit 7 and the first to fifth arms 21 to 25, respectively. Each of the electromagnetic brakes is released while an arm operation switch (described later) provided in the microscope unit 7 is pressed, to allow the microscope unit 7 and the first to fifth arms 21 to 25 to turn. Additionally, air brakes may be employed in place of the electromagnetic brakes.

In each of the joints, an encoder and an actuator, in addition to the above-described electromagnetic brake, may be mounted. An encoder, in a case of being provided in the first joint 11, for example, detects an angle of rotation about the first axis $O_1$. An actuator includes an electric motor such a servo motor, for example, is driven under control of the control device 3, and causes rotation through a predetermined angle in a joint. An angle of rotation in a joint is set by the control device 3 based on an angle of rotation about each rotation axis (the first to sixth axes $O_1$ to $O_6$), as a value for moving the microscope unit 7, for example. Thus, the joint provided with an active driving mechanism such as an actuator forms a rotation axis that actively rotates by driving control of the actuator.

The microscope unit 7 includes a cylindrical casing and an imaging unit 71 that enlarges and captures an image of an observed object. In addition thereto, the microscope unit 7 includes an arm operation switch that accepts input of an operation of releasing the electromagnetic brake in each of the first to sixth joints 11 to 16 to allow each of the joints to turn, and a cruciform lever with which the power and the focal distance of the imaging unit with respect to an observed object may be changed. While a user is pressing the arm operation switch, the electromagnetic brakes of the first to sixth joints 11 to 16 are released.

The imaging unit 71 captures an image of a subject under control of the control device 3. The imaging unit 71 includes a plurality of lenses and an imaging element that are housed in the casing. The imaging element receives light of a subject image produced by the lenses and converts it into an electric signal (imaging signal). The imaging unit 71 forms an observation optical system that produces a subject image transmitted through the lenses on an imaging surface of the imaging element. The imaging element includes a charge coupled device (CCD) image sensor or a complementary metal oxide semiconductor (CMOS) image sensor.

Figure 3:
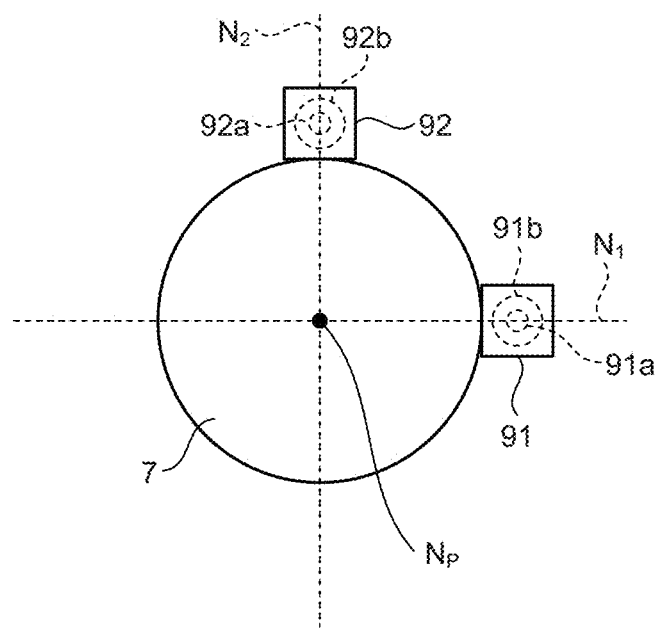
FIG. 3 is a view illustrating a configuration of a microscope unit as seen from a direction of an arrow A in FIG. 1.

FIG. 3 is a view illustrating a configuration of the microscope unit as seen from a direction of an arrow A in FIG. 1. Meanwhile, in the microscope unit 7, there are mounted a first projection unit 91 and a second projection unit 92 that are placed outside the casing and project light (hereinafter also referred to as "projection light") onto an observation area. The first projection unit 91 and the second projection unit 92 form a projection apparatus that performs line irradiation in which a subject is irradiated in a form of lines.

The first projection unit 91 is formed by using a point light source 91a and a refractive lens 91b that refracts light emitted by the point light source 91a. Meanwhile, the second projection unit 92 is formed by using a point light source 92a and a refractive lens 92b that refracts light emitted by the point light source 92a and emits light radially. Additionally, examples of a point light source include a laser diode (LD), a light emitting diode (LED), and the like. Further, a diffraction grating may be used in place of a refractive lens.

The first projection unit 91 and the second projection unit 92 respectively emit radial light to different planes including an optical axis of the observation optical system formed of the imaging unit 71. In the present embodiment, a line segment $N_1$ that passes through an optical axis $N_P$ of the imaging unit 71 of the microscope unit 7 and an optical axis of light applied by the first projection unit 91 is perpendicular to a line segment $N_2$ that passes through the optical axis $N_P$ and an optical axis of light applied by the second projection unit 92.

The light source device 8 controls emission of light under control of the control device 3. The light source device 8 is connected to the microscope device 2 via a light-source cable 81. An optical fiber and a transmission line for a control signal are inserted into the light-source cable 81. The light source device 8 includes a light emission unit 82 that supplies illuminating light to the microscope device 2 via the light-source cable 81, a driving unit 83 that outputs a control signal to the first projection unit 91 and the second projection unit 92 and controls driving of the first projection unit 91 and the second projection unit 92, and a control unit 84 that controls driving of respective components of the light source device 8 and controls input/output of information to/from the control device 3.

The control device 3 receives an imaging signal output from the microscope device 2 and performs predetermined signal processing on the imaging signal, to generate image data to be displayed. Additionally, the control device 3 may be placed inside the base unit 5 to be integral with the microscope device 2.

The control device 3 includes an image processing unit 31, an input unit 32, an output unit 33, a control unit 34, and a storage unit 35. Additionally, the control device 3 may further include a power supply unit (not illustrated) or the like that generates a power-supply voltage for driving the microscope device 2 and the control device 3 and supplies the power-supply voltage to respective parts of the control device 3 and to the microscope device 2 via a transmission cable.

The image processing unit 31 performs noise removal and signal processing such as A/D conversion as needed, on an imaging signal output from the microscope unit 7. The image processing unit 31 generates an image signal to be displayed on the display device 4, based on the imaging signal having been subjected to the signal processing. The image processing unit 31 performs predetermined signal processing on an imaging signal to generate a displayed image signal including a subject image. In this regard, the image processing unit 31 performs known image processing including various kinds of image processing such as detection, interpolation, color correction, color enhancement, edge enhancement, and the like. The image processing unit 31 outputs the generated image signal to the display device 4.

Additionally, the image processing unit 31 may include an AF processing unit that outputs a predetermined AF evaluation value of each input frame based on an imaging signal of the input frame, and an AF arithmetic unit that performs AF arithmetic processing for selecting a frame, a focus lens position, or the like that is the most suitable as a focus position, from the AF evaluation values of the respective frames provided from the AF processing unit.

The input unit 32 is implemented by using a user interface such as a keyboard, a mouse, or a touch panel, and accepts input of various kinds of information.

The output unit 33 is implemented by using a speaker, a printer, a display, or the like, and outputs various kinds of information.

The control unit 34 controls driving of the respective components including the control device 3 and the microscope device 2, input/output of information to/from the respective components, and the like. The control unit 34 generates a control signal by referring to communication information data (communication format information or the like, for example) stored in the storage unit 35, and transmits the generated control signal to the microscope device 2.

Moreover, the control unit 34 generates a synchronizing signal and a clock for the microscope unit 7 and the control device 3. A synchronizing signal (synchronizing signal that indicates an imaging timing, or the like, for example) and a clock (clock for serial communication, for example) for the microscope unit 7 are transmitted via a line not illustrated, to the microscope unit 7, which is then driven in accordance with the synchronizing signal and the clock.

The storage unit 35 is implemented by using a semiconductor memory such as a flash memory or a dynamic random access memory (DRAM), and stores therein communication information data (communication format information or the like, for example) and the like. Additionally, various programs or the like executed by the control unit 34 may be stored in the storage unit 35.

The above-described components of the image processing unit 31 and the control unit 34 are implemented by using either a general-purpose processor such as a central processing unit (CPU) including an internal memory (not illustrated) in which programs are stored, or a dedicated processor that performs a specific function, such as an arithmetic circuit for various operations, typified by an application specific integrated circuit (ASIC). Alternatively, the above-described components may be formed by using a field programmable gate array (FPGA, not illustrated) that is a kind of a programmable integrated circuit. Additionally, in a case of using an FPGA, a memory in which configuration data is stored may be provided so that the FPGA that is a programmable integrated circuit may be configured by using the configuration data read from the memory.

The display device 4 receives image data generated by the control device 3 from the control device 3 and displays an image corresponding to the image data. The display device 4 includes a display panel formed of liquid crystal or organic electroluminescence (EL). Meanwhile, in addition to the display device 4, there may be provided an output device that outputs information using a speaker, a printer, or the like.

There will be described an outline of an operation that is to be performed using the medical observation system 1 having the above-described configuration. In a case where a user, i.e., an operator, operates a head of a patient that is an observed object, the operator grasps the microscope unit 7 and moves it to a desired position with the arm operation switch of the microscope unit 7 pressed, while visually checking an image displayed on the display device 4. Then, the operator determines an imaging field of view of the microscope unit 7 and subsequently takes his fingers off the arm operation switch. As a result of this, the electromagnetic brakes operate in the first to sixth joints 11 to 16, and an imaging field of view of the microscope unit 7 is fixed. Thereafter, the operator adjusts a magnification, a focal distance, and the like with respect to the observed object.

Figure 4:
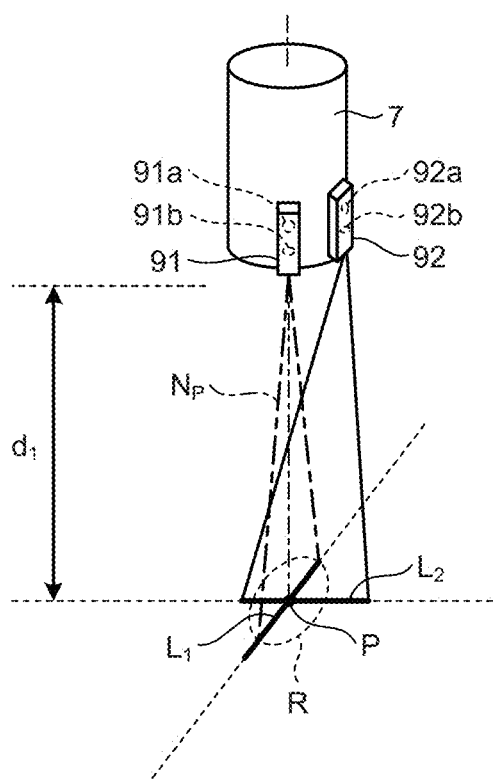
FIG. 4 is a view (first example) for explaining a projection process performed by the microscope unit of the medical observation system according to the embodiment of the present disclosure.
Figure 5:
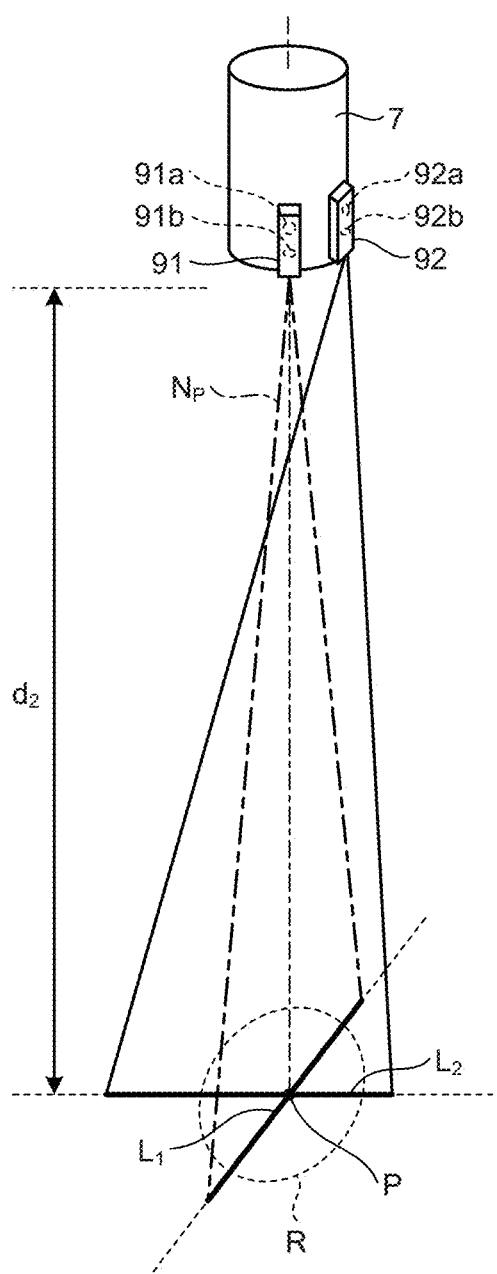
FIG. 5 is a view (second example) for explaining a projection process performed by the microscope unit of the medical observation system according to the embodiment of the present disclosure.

Next, a projection process performed by the first projection unit 91 and the second projection unit 92 will be described with reference to FIGS. 4 and 5. FIGS. 4 and 5 are views for explaining a projection process performed by the microscope unit of the medical observation system according to the embodiment of the present disclosure. FIG. 4 illustrates projection light $L_1$ and $L_2$ located at the shortest distance $d_1$ among possible focal distances of the imaging unit 71 of the microscope unit 7. FIG. 5 illustrates projection light $L_1$ and $L_2$ located at the longest distance $d_2$ among possible focal distances of the imaging unit 71 of the microscope unit 7.

Both of the projection light $L_1$ and the projection light $L_2$ illuminate an observation area R in a form of lines. The observation area R corresponds to a light acquiring area, an image of which is captured by the microscope unit 7 (the imaging unit 71). The projection light $L_1$ and the projection light $L_2$ extend in directions perpendicular to each other in the observation area R. The optical axis $N_P$ of the microscope unit 7 passes through an intersection P of the projection light $L_1$ and the projection light $L_2$. In this regard, the optical axis $N_P$ passes through the intersection P of the projection light $L_1$ and the projection light $L_2$ in each of all positions within a range of possible working distance of the imaging unit 71. The range of working distance corresponds to a focusable range. Thus, an observer may grasp the center of an image to be captured by the microscope unit 7 by identifying the intersection P of the projection light $L_1$ and $L_2$.

In the above-described embodiment, the first projection unit 91 and the second projection unit 92 that perform line illumination on an observation area are provided on an outer surface of the casing of the microscope unit 7, and thus the observation area is irradiated with the projection light $L_1$ and $L_2$ forming the intersection P that crosses an optical axis of the microscope unit 7 irrespective of a focal position. According to the present embodiment, an optical center is indicated by an intersection of light in plural types of line illumination, irrespective of a focal position. As a result of this, it is possible to achieve perception of the center position of an observation area with a simple configuration without complicating the apparatus configuration.

Additionally, in the above-described embodiment, light in line illumination by the first projection unit 91 and light in line illumination by the second projection unit 92 cross each other in a position through which the optical axis of the imaging unit 71 passes, within a range of working distance of the microscope unit 7 (the imaging unit 71).

Further, in the above-described embodiment, FIGS. 4 and 5 illustrate an example in which the projection light $L_1$ and the projection light $L_2$ extend by such a length as to pass through the observation area R, in other words, by a length greater than the diameter of the observation area R in a focal position, for example. However, the length of the projection light $L_1$ or $L_2$ may be smaller than the diameter of the observation area R so long as perception of an optical center is enabled.

Moreover, though the configuration in which two projection units are included has been described in the above-described embodiment, there may be formed a configuration in which three or more projection units are included. In this case, projection light emitted by one of the projection units and projection light emitted by another cross each other at a point and the optical axis $N_P$ of the microscope unit 7 passes through the intersection of the light. Further, in a case where three or more projection units are included, at least two or more projection units respectively emit projection light onto different planes including the optical axis of the observation optical system of the imaging unit 71. The projection light emitted by one of the two or more projection units and the projection light emitted by the other cross each other in any position within a range of at least a possible working distance of the observation optical system.

First Modification

Figure 6:
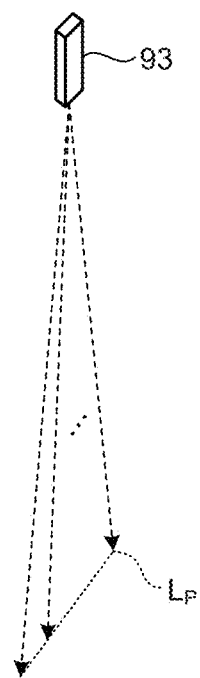
FIG. 6 is a view for explaining a projection process in a medical observation system according to a first modification of the present disclosure.

Next, a first modification of the embodiment will be described with reference to FIG. 6. FIG. 6 is a view for explaining a projection process in a medical observation system according to the first modification of the present disclosure. In the first modification, a projection unit 93 will be described as another example of the first projection unit 91 or the second projection unit 92. In the above-described embodiment, the first projection unit 91 may be replaced with the projection unit 93, the second projection unit 92 may be replaced with the projection unit 93, or both of the first projection unit 91 and the second projection unit 92 each may be replaced with the projection unit 93. The other components are the same as those in the medical observation system 1 of the above-described embodiment, and thus description thereof is omitted.

The projection unit 93 performs line irradiation in which a subject (observation area) is irradiated in a form of lines. The projection unit 93 is formed by using a point light source and a control mechanism that controls an emission direction of light emitted by the point light source. The control mechanism has a configuration that causes a beam of light emitted by the point light source to move along a scanning direction (in this modification, along a line crossing the optical axis $N_P$). Examples of a moving mechanism include a configuration that moves the light source or moves a lens that refracts light emitted by the light source, for example. The projection unit 93 performs line illumination on an observation area perceptually by movement of an irradiation position of spotty irradiation light $L_P$. A scanning plane of the irradiation light $L_P$ includes the optical axis NE of the microscope unit 7. In this regard, it is preferable that scanning is performed at such time intervals (at approximately 5 Hz or more, for example) as to allow a plurality of beams of the irradiation light $L_P$ to continue to appear as afterimages. With light applied by the projection unit 93, an observer is caused to perceive projection light formed by the plurality of beams of the irradiation light $L_P$ that are arranged in a form of lines.

In the first modification, the optical axis $N_P$ of the microscope unit 7 passes through an intersection of projection light generated through scanning of the irradiation light $L_P$ and projection light generated by the other projection unit. Thus, an observer may grasp the center of an image to be captured by the microscope unit 7 by identifying an intersection of the projection light.

Also in a case where projection light is applied through scanning of spotty light (irradiation light $L_P$) in an observation area as in the first modification, an optical center is indicated in the same manner as in the above-described embodiment. As a result of this, it is possible to achieve perception of the center position of an observation area with a simple configuration.

Second Modification

Figure 7:
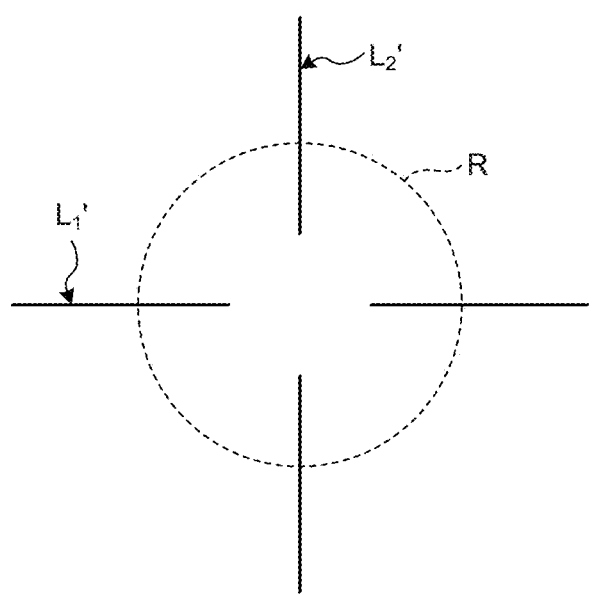
FIG. 7 is a view for explaining a projection process in a medical observation system according to a second modification of the present disclosure.

Next, a second modification of the embodiment will be described with reference to FIG. 7. FIG. 7 is a view for explaining a projection process in a medical observation system according to the second modification of the present disclosure. The configuration of the medical observation system according to the second modification is the same as that of the medical observation system 1 according to the above-described embodiment or the first modification, and thus description thereof is omitted.

The first projection unit 91 and the second projection unit 92 emit illuminating light that illuminates a subject in a form of intermittent lines, to an observation area. In the first projection unit 91 and the second projection unit 92 according to the second modification, a part of an emission surface is masked, for example. Thus, both of projection light $L_1'$ emitted by the first projection unit 91 and projection light $L_2'$ emitted by the second projection unit 92 illuminate the observation area R in a form of intermittent lines. The projection light $L_1'$ and the projection light $L_2'$ extend in directions perpendicular to each other in the observation area R. A portion where the projection light $L_1'$ and the projection light $L_2'$ cross each other is not irradiated with light. An observer may grasp the center of an image to be captured by the microscope unit 7 by spatially recognizing a portion where the projection light $L_1'$ and the projection light $L_2'$ cross each other.

In the second modification, the first projection unit 91 and the second projection unit 92 perform line illumination intermittently. This makes it possible to achieve perception of the center position of an observation area with a simple configuration without complicating the apparatus configuration in the same manner as in the embodiment.

Further, in the second modification, a portion where the projection light $L_1'$ and the projection light $L_2'$ cross each other is not irradiated with light. This may inhibit reduction of visibility of a subject in an observation area near an intersection of the projection light.

Additionally, in the second modification, projection light may be applied through scanning of spotty projection light (irradiation light $L_P$) in an observation area in the same manner as in the first modification. In this case, emission of the irradiation light $L_P$ is stopped near the optical axis $N_P$ including the optical axis $N_P$ of the microscope unit 7.

Third Modification

Figure 8:
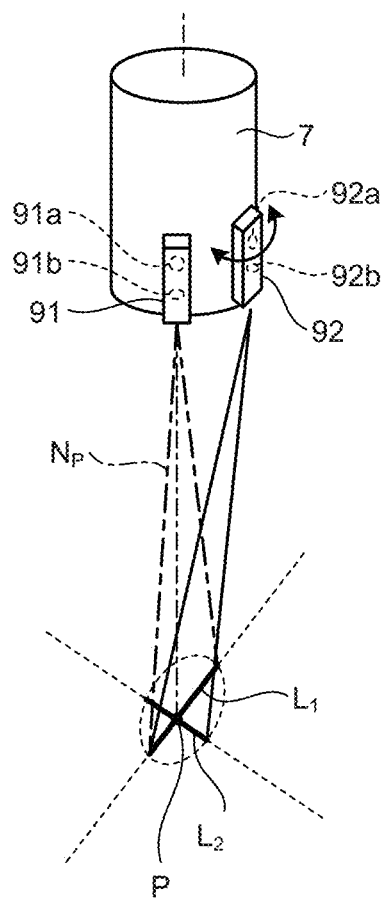
FIG. 8 is a view for explaining a projection process in a medical observation system according to a third modification of the present disclosure.

Next, a third modification of the embodiment will be described with reference to FIG. 8. FIG. 8 is a view for explaining a projection process in a medical observation system according to the third modification of the present disclosure. The medical observation system according to the third modification is provided with a moving mechanism that moves the second projection unit 92 on the outer surface of a lens barrel of the microscope unit 7. The other components are the same as those in the medical observation system 1 of the above-described embodiment, and thus description thereof is omitted.

The second projection unit 92 is moved around the optical axis $N_P$ of the microscope unit 7, on the outer surface of the lens barrel of the microscope unit 7 by the moving mechanism (not illustrated). The moving mechanism, for example, includes a rail provided on the outer surface of the lens barrel of the microscope unit 7 and a moving member that holds the second projection unit 92 and is movable along the rail. The moving mechanism moves the second projection unit 92 under control of the control unit 34 or 84.

Movement of the second projection unit 92 causes a change in an angle formed by the projection light $L_1$ and the projection light $L_2$. In this regard, the optical axis $N_P$ of the microscope unit 7 passes through the intersection P of the projection light $L_1$ and the projection light $L_2$, irrespective of a focal position.

In the third modification, the first projection unit 91 and the second projection unit 92 perform line illumination. This makes it possible to achieve perception of the center position of an observation area with a simple configuration without complicating the apparatus configuration in the same manner as in the embodiment.

Further, the third modification enables a change in an angle of the projection light $L_2$ with respect to the projection light $L_1$ by movement of the second projection unit 92. If distortion occurs in projection light due to irregularities in a subject in an observation area, the third modification may reduce such distortion of the projection light by movement of the second projection unit 92. As a result of this, it is possible to inhibit reduction of visibility of projection light, thereby certainly achieving perception of the center position of an observation area.

Additionally, in the third modification, projection light may be applied through scanning of spotty light (the irradiation light $L_P$) in an observation area in the same manner as in the first modification, and line illumination may be intermittently performed in the same manner as in the second modification.

Fourth Modification

Figure 9:
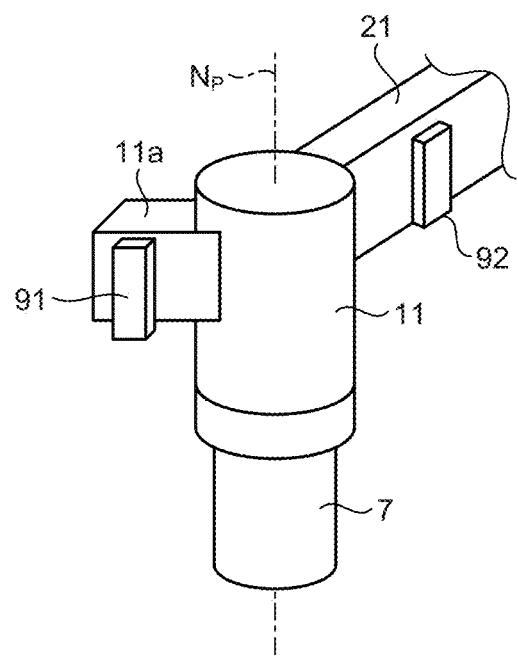
FIG. 9 is a perspective view illustrating a configuration of a principal part of a medical observation system according to a fourth modification of the present disclosure.

Next, a fourth modification of the embodiment will be described with reference to FIG. 9. FIG. 9 is a perspective view illustrating a configuration of a principal part of a medical observation system according to the fourth modification of the present disclosure. The medical observation system according to the fourth modification has the same configuration as that of the medical observation system 1 of the above-described embodiment except that the first projection unit 91 and the second projection unit 92 are provided in a portion other than the lens barrel of the microscope unit 7.

The first projection unit 91 is provided in the first joint 11. More specifically, the first projection unit 91 is held by a joining member 11a. The joining member 11a is connected to a position different from a portion from which the first arm 21 extends in the first joint 11.

The second projection unit 92 is provided in the first arm 21. The second projection unit 92 is provided in a position where projection light therefrom does not interfere with the microscope unit 7, for example.

Both of projection light emitted from the first projection unit 91 and projection light emitted from the second projection unit 92 (the projection light $L_1$ and $L_2$) illuminate an observation area in a form of lines in the same manner as in the embodiment. The projection light from the first projection unit 91 and the projection light from the second projection unit 92, like the projection light $L_1$ and $L_2$, form an intersection through which the optical axis $N_P$ of the microscope unit 7 passes. Thus, an observer may grasp the center of an image to be captured by the microscope unit 7 by identifying the intersection of the projection light.

According to the fourth modification, also in a case where the first projection unit 91 and the second projection unit 92 are provided in a portion other than the microscope unit 7, by causing the projection light to cross each other in a position through which the optical axis $N_P$ of the microscope unit 7 passes, it is possible to achieve perception of the center position of an observation area with a simple configuration without complicating the apparatus configuration in the same manner as in the embodiment.

Additionally, in the fourth modification, projection light may be applied through scanning of spotty light (the irradiation light $L_P$) in an observation area in the same manner as in the first modification, line illumination may be intermittently performed in the same manner as in the second modification, and one of the projection units may be movable relative to the other in the same manner as in the third modification.

OTHER EMBODIMENTS

Appropriately combining the plurality of disclosed components of the medical observation system according to the above-described embodiment of the present disclosure may make variations. For example, some components may be removed from all the described components of the medical observation system according to the embodiment of the present disclosure. Alternatively, the described components of the medical observation systems according to the above-described embodiment and its first to third modifications of the present disclosure may be appropriately combined with each other.

Further, in the medical observation system according to the embodiment of the present disclosure, the term "unit" described above may be read as "means", "circuit", or the like. For example, a control unit may be read as a control means or a control circuit.

Moreover, programs that the medical observation system according to the embodiment of the present disclosure is caused to execute are offered, having been recorded as file data in an installable format or an executable format on a computer-readable recording medium such as a CD-ROM, a flexible disk (FD), CD-R, a digital versatile disk (DVD), a USB medium, or a flash memory.

Furthermore, programs that the medical observation system according to the embodiment of the present disclosure is caused to execute may be stored in a computer connected with a network such as the Internet, and be configured so as to be offered through downloading via the network.

Hereinabove, some aspects of the embodiment of the present application have been described in detail with reference to the drawings. However, those are mere examples, and the present disclosure may be carried out in modes including the modes described in the section of disclosure of the present disclosure and further including other modes in which various modifications or improvements are made based on the knowledge of a person skilled in the art.

Furthermore, the present technique may have the following configuration.

(1) A medical projection apparatus including:
 a plurality of projectors each configured to project projection light onto an observation area of an observation optical system, wherein
 at least two or more projectors of the plurality of projectors are configured to respectively emit projection light to different planes including an optical axis of the observation optical system, and
 the projection light emitted by the two or more projectors cross each other in any position within a range of at least a possible working distance of the observation optical system.
(2) The medical projection apparatus according to (1), wherein at least one of the plurality of projectors is configured to
 radially emit light to the plane to which the projector emits the projection light, and
 irradiate the observation area with the projection light in a form of lines.
(3) The medical projection apparatus according to (1) or (2), wherein at least one of the plurality of projectors is configured to apply the projection light formed of a plurality of spotty light beams that are applied through scanning of a light emission position and are arranged in a form of lines.
(4) The medical projection apparatus according to any one of (1) to (3), wherein at least one of the plurality of projectors is configured to rotate relative to the other projectors, about an optical axis of the observation optical system.
(5) The medical projection apparatus according to any one of (1) to (4), wherein the projection light emitted by the two or more projectors cross each other in each of all positions within a range of a possible working distance of the observation optical system.
(6) The medical projection apparatus according to (5), wherein the range of the working distance is a focusable range.
(7) A medical observation system including:
 an imaging device configured to capture an image of a subject in an observation area; and
 a plurality of projectors each configured to project projection light onto an observation area of an observation optical system, wherein
 at least two or more projectors of the plurality of projectors are configured to respectively emit projection light to different planes including an optical axis of the observation optical system, and
 the projection light emitted by the two or more projectors cross each other in any position within a range of at least a possible working distance of the observation optical system of the imaging unit.

As described above, the medical projection apparatus and the medical observation system according to the present disclosure is useful for perceiving a center position of an observation area with a simple configuration.

The present disclosure produces effects of enabling perception of the center position of an observation area with a simple configuration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medical projection apparatus comprising:
 a plurality of projectors each configured to project projection light onto an observation area of an observation optical system, wherein
 at least two or more projectors of the plurality of projectors are configured to respectively emit projection light to different planes including an optical axis of the observation optical system,
 the projection light emitted by the two or more projectors cross each other in any position within a range of at least a possible working distance of the observation optical system, and
 at least one of the plurality of projectors is configured to apply the projection light formed of a plurality of spotty light beams that are applied through scanning of a light emission position and are arranged in a form of lines.

2. The medical projection apparatus according to claim 1, wherein at least one of the plurality of projectors is configured to
 radially emit light to the plane to which the projector emits the projection light, and
 irradiate the observation area with the projection light in a form of lines.

3. The medical projection apparatus according to claim 1, wherein at least one of the plurality of projectors is configured to rotate relative to the other projectors, about an optical axis of the observation optical system.

4. The medical projection apparatus according to claim 1, wherein the projection light emitted by the two or more projectors cross each other in each of all positions within a range of a possible working distance of the observation optical system.

5. The medical projection apparatus according to claim 1, wherein the range of the working distance is a focusable range.

6. A medical observation system comprising:
 an image sensor configured to capture an image of a subject in an observation area; and
 a plurality of projectors configured to project projection light onto an observation area of an observation optical system, wherein at least two or more projectors of the plurality of projectors are configured to respectively emit projection light to different planes including an optical axis of the observation optical system, the projection light emitted by the two or more projectors cross each other in any position within a range of at least a possible working distance of the observation optical system of the image sensor, and at least one of the plurality of projectors is configured to apply the projection light formed of a plurality of spotty light beams that are applied through scanning of a light emission position and are arranged in a form of lines.

7. The medical observation system according to claim 6, wherein at least one of the plurality of projectors is configured to rotate relative to the other projectors, about an optical axis of the observation optical system.

8. The medical observation system according to claim 6, wherein the at least one of the plurality of projectors configured to rotate relative to the other projectors is configured to emit light in intermittent lines.

9. The medical observation system according to claim 6, wherein the at least two or more projectors are secured to the image sensor.

10. The medical observation system according to claim 6, wherein at least of one of the plurality of projectors is secured to a different component of the system than the image sensor.

11. The medical observation system according to claim 10 wherein at least of two of the plurality of projectors are secured to different components of the system than the image sensor and from one another.

12. The medical observation system according to claim 6, further comprising a first joint that holds the image sensor and a first arm extending from the first joint, wherein at least one of the plurality of projectors is secured to the first arm.

13. A medical projection apparatus comprising:

a plurality of projectors each configured to project projection light onto an observation area of an observation optical system, wherein at least two or more projectors of the plurality of projectors are configured to respectively emit projection light to different planes including an optical axis of the observation optical system, the projection light emitted by the two or more projectors cross each other in any position within a range of at least a possible working distance of the observation optical system, and at least one of the plurality of projectors is configured to rotate relative to the other projectors, about an optical axis of the observation optical system.

\* \* \* \* \*